United States Patent
Takimoto

(10) Patent No.: US 12,403,773 B2
(45) Date of Patent: Sep. 2, 2025

(54) POWER SUPPLY APPARATUS

(71) Applicant: Daifuku Co., Ltd., Osaka (JP)

(72) Inventor: Hiroki Takimoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/231,356

(22) Filed: Aug. 8, 2023

(65) Prior Publication Data

US 2024/0051401 A1   Feb. 15, 2024

(30) Foreign Application Priority Data

Aug. 9, 2022   (JP) ................ 2022-127000

(51) Int. Cl.
*B60L 9/12*   (2006.01)

(52) U.S. Cl.
CPC ............. *B60L 9/12* (2013.01); *B60L 2200/26* (2013.01); *B60L 2210/30* (2013.01)

(58) Field of Classification Search
CPC .... B60L 9/12; B60L 2200/26; B60L 2210/30; B60L 3/0069; B60L 13/06; B60L 5/005; B60M 7/003; H02J 50/12
See application file for complete search history.

(56) References Cited

U.S. PATENT DOCUMENTS

| | | | |
|---|---|---|---|
| 9,935,482 B1* | 4/2018 | Leabman | H02J 50/402 |
| 10,899,234 B2* | 1/2021 | Ichikawa | B60L 53/68 |
| 11,984,732 B2* | 5/2024 | Oki | B60L 5/36 |
| 2005/0037241 A1* | 2/2005 | Schneider | H01M 10/0445 |
| | | | 429/9 |
| 2010/0225271 A1* | 9/2010 | Oyobe | B60L 50/61 |
| | | | 320/108 |
| 2012/0326522 A1* | 12/2012 | Fukushima | B60L 5/005 |
| | | | 307/104 |
| 2013/0334896 A1* | 12/2013 | Yamamoto | H01F 38/14 |
| | | | 307/104 |
| 2015/0048767 A1* | 2/2015 | Takezawa | H02P 6/14 |
| | | | 327/109 |
| 2015/0137602 A1* | 5/2015 | Huang | H02J 5/00 |
| | | | 307/52 |
| 2016/0156200 A1* | 6/2016 | Kim | H02J 50/20 |
| | | | 307/104 |
| 2017/0040810 A1* | 2/2017 | Hu | H02J 7/00 |
| 2018/0351407 A1* | 12/2018 | Ogishima | H02J 7/0068 |
| 2019/0097448 A1* | 3/2019 | Partovi | H02J 7/0013 |
| 2019/0118664 A1* | 4/2019 | Ichikawa | B60L 53/305 |

(Continued)

FOREIGN PATENT DOCUMENTS

JP   6586939 B2   10/2019

*Primary Examiner* — Daniel Kessie
*Assistant Examiner* — Brian K Baxter
(74) *Attorney, Agent, or Firm* — The Webb Law Firm

(57) ABSTRACT

A power supply apparatus mounted in a moving body includes: a pickup coil configured to generate induced electromotive force by an AC current flowing through a feeder line arranged along a moving route of the moving body; a power receiver configured to convert an AC power into a DC power; a capacitor connected to the output side of the power receiver; a circuit protector provided between the power receiver and the capacitor, and an electrical load; and an external power supply connector provided to allow connection of a DC external power supply to a first node between the circuit protector and the electrical load.

4 Claims, 6 Drawing Sheets

(56) References Cited

U.S. PATENT DOCUMENTS

| | | | | |
|---|---|---|---|---|
| 2020/0220367 | A1* | 7/2020 | Cho | H02J 7/00034 |
| 2021/0044151 | A1* | 2/2021 | Nakao | H02J 50/80 |
| 2021/0344229 | A1* | 11/2021 | Nakao | H02J 50/40 |
| 2022/0126707 | A1* | 4/2022 | An | B60L 53/66 |
| 2023/0288493 | A1* | 9/2023 | Miyazaki | H02J 50/005 |
| 2023/0412002 | A1* | 12/2023 | Tanaka | H02J 50/12 |
| 2024/0128769 | A1* | 4/2024 | Tomita | H02J 50/12 |

* cited by examiner

POWER SUPPLY APPARATUS

CROSS-REFERENCE TO RELATED APPLICATION

This application claims priority to Japanese Patent Application No. 2022-127000 filed Aug. 9, 2022, the disclosure of which is hereby incorporated by reference in its entirety.

BACKGROUND OF THE INVENTION

1. Field of the Invention

The present invention relates to a power supply apparatus mounted in a moving body and receiving power from feeder lines arranged along a moving route of the moving body and supplying the power to an electrical load of the moving body.

2. Description of the Related Art

Japanese Patent No. 6586939 discloses an overhead transport vehicle (5) as one example of the above-described moving body (The reference numerals in the brackets in the background art are those of a literature which is referred to). This overhead transport vehicle (5) transports an article along a moving route constituted by rails suspended from the ceiling of a building. In maintenance, such as inspection or repair, of the overhead transport vehicle (5), the overhead transport vehicle (5) is lowered to the ground side using a maintenance lifter (2). At this time, the overhead transport vehicle (5) is separated from the rails (4) as the moving route. The feeder lines are arranged along the rails (4), and therefore, when the overhead transport vehicle (5) is separated from the moving route for maintenance, the overhead transport vehicle (5) is also separated from the feeder lines, making it impossible for the overhead transport vehicle (5) to receive the power supply from the feeder lines. More specifically, the moving body receiving power in a contactless manner from the feeder lines arranged along the moving route of the moving body is separated from the moving route in maintenance, making it difficult for the moving body to receive the power supply through the feeder lines in many cases.

Japanese Unexamined Patent Application Publication No. 2022-3858 discloses one example of a power receiving section (4) receiving the power supply in a contactless manner from feeder lines. This power receiving section (4) includes a pickup coil (40) receiving power by electromagnetic induction from the feeder lines (11) to which an AC power is transmitted and a full-wave rectifier circuit (43) rectifying an AC current induced to the pickup coil (40). Further, an output capacitor (8) is provided between the power receiving section (4) and an electrical load, such as a motor (14), for the purposes of smoothing a pulsating component remaining in a DC current rectified by the full-wave rectifier circuit (43), suppressing fluctuations caused by load fluctuations when the electrical load is operated, and the like.

When the moving body cannot receive the power supply through the feeder lines in the maintenance of the moving body described above, the power is supplied from an external power supply to the moving body, for example. The connection of the external power supply to the moving body poses a risk that, when the amount of a residual charge of the output capacitor of the moving body is large, a large current suddenly flows into a connector or the like serving as a contact point. Therefore, before the external power supply is connected, the residual charge of the output capacitor is preferably discharged in advance. However, when such discharge treatment is performed for every maintenance, the efficiency of maintenance work decreases.

SUMMARY OF THE INVENTION

In view of the above-described background, it is desired to provide a power supply apparatus capable of receiving power from the feeder lines arranged along the moving route of the moving body and supplying the power to the electrical load of the moving body and, unless the power can be received from the feeder lines, appropriately supplying the power to the electrical load from the external power supply.

A power supply apparatus in view of the above-described problems is a power supply apparatus mounted in a moving body and receiving power in a contactless manner from a feeder line arranged along a moving route of the moving body and supplying the power to an electrical load of the moving body, and the power supply apparatus includes: a pickup coil configured to generate induced electromotive force by an alternating current flowing into the feeder line; a power receiver configured to convert an alternating-current power received by the pickup coil into a direct-current power; a capacitor connected to a positive electrode and a negative electrode on an output side of the power receiver; a circuit protector provided between (i) the power receiver and the capacitor and (ii) the electrical load; and an external power supply connector provided to allow the connection of a direct-current external power supply to a first node between the circuit protector and the electrical load.

According to this configuration, the external power supply connector is provided on the electrical load side across the circuit protector with respect to the capacitor, and therefore, after the electrical connection between the power receiver and the electrical load is cut off by the circuit protector, for example, the flow of a large current into the external power supply from the capacitor can be suppressed even when the external power supply is connected to the external power supply connector without discharging a residual charge of the capacitor. The safety of work of connecting the external power supply to the moving body can be maintained without performing discharge treatment of discharging the residual charge of the capacitor when the external power supply is connected to the moving body for inspection, repair, or the like, and therefore work efficiency can be enhanced. Thus, this configuration can provide the power supply apparatus capable of receiving power from the feeder lines arranged along the moving route of the moving body and supplying the power to the electrical load of the moving body and, unless the power can be received from the feeder lines, appropriately supplying the power to the electrical load from an external power supply.

Further features and advantages of the power supply apparatus will become apparent from the following description of exemplary and non-limiting embodiments described with reference to the drawings.

DESCRIPTION OF THE INVENTION

Figure 1:
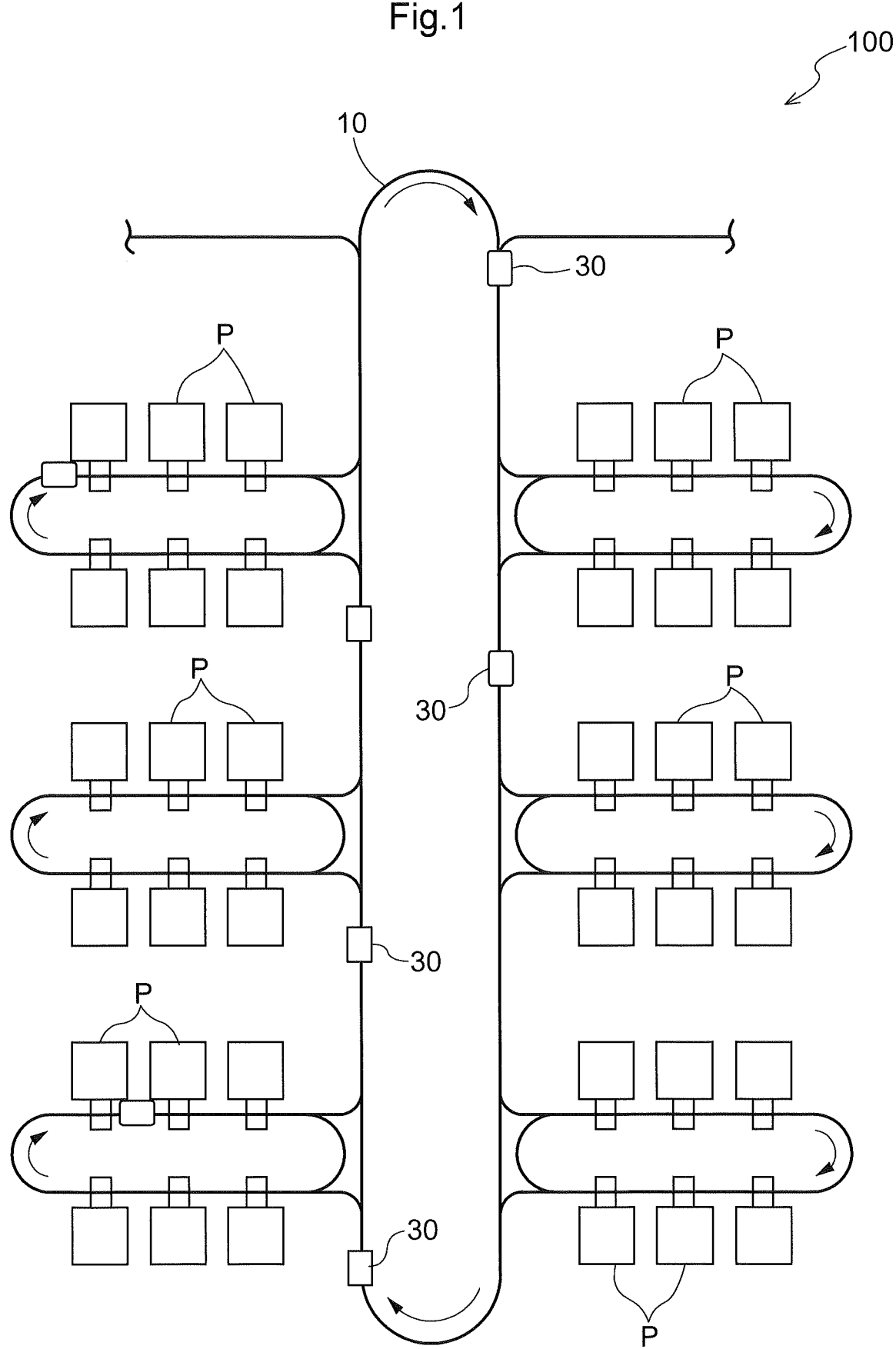
FIG. 1 is a plan view illustrating one example of an article transport facility.
Figure 2:
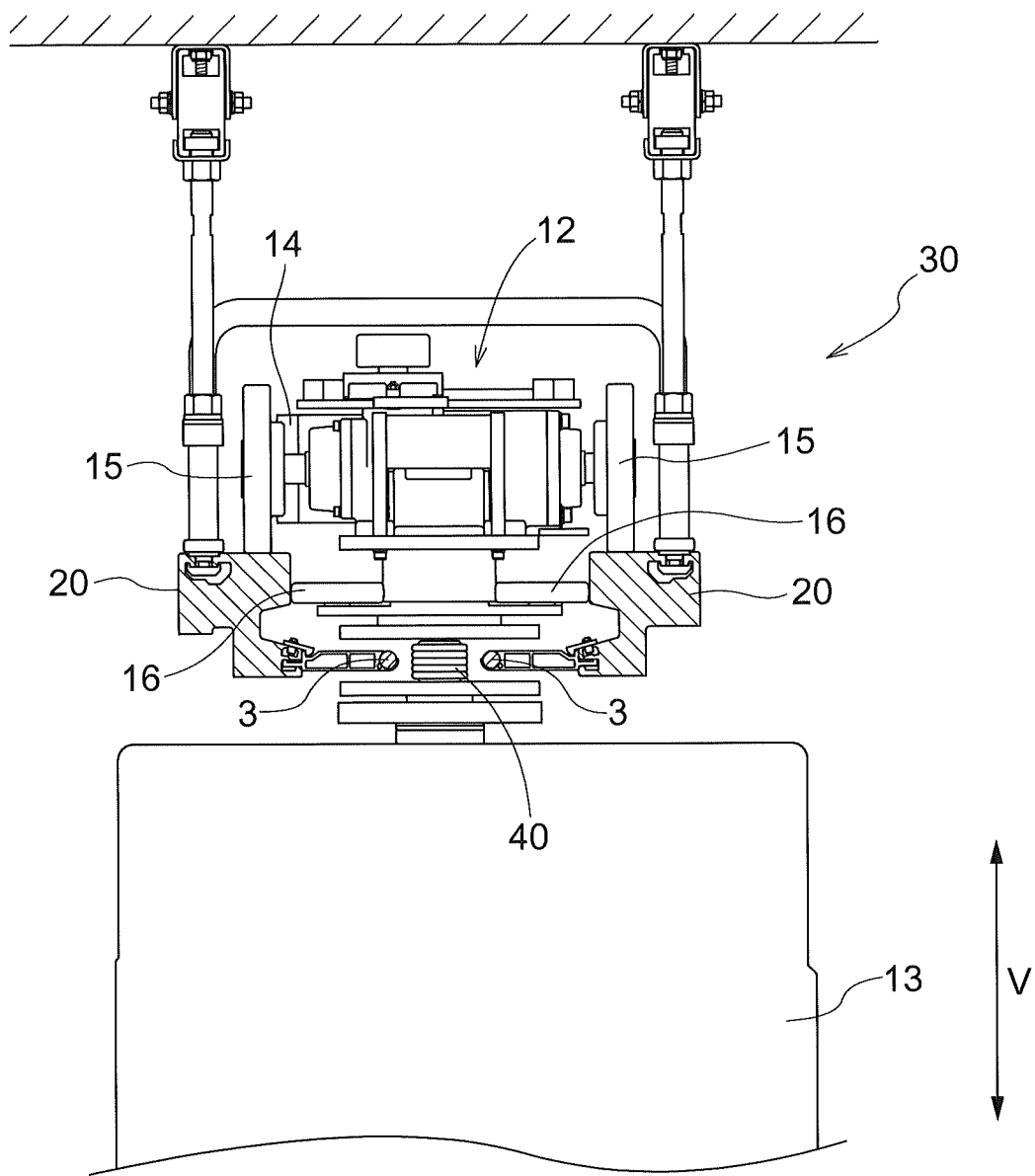
FIG. 2 is a front view illustrating one example of an article transport vehicle.

Hereinafter, an embodiment of a power supply apparatus mounded in a moving body and receiving power in a contactless manner from feeder lines arranged along a moving route of the moving body and supplying the power to an electrical load of the moving body is described based on the drawings. This embodiment gives the description taking an overhead transport vehicle 30 using rails 20 suspended from the ceiling of a building as a moving route 10 and moving along the rails 20 and transporting an article as illustrated in FIGS. 1, 2, for example, as one example of the moving body. An article transport vehicle as the moving body is not limited to such an overhead transport vehicle and may be another article transport vehicle, such as a floor transport vehicle or a stacker crane using rails installed on the floor surface as the moving route and moving along the rails and transporting an article. Further, the moving body may be an article transport vehicle traveling on rails horizontally arranged on the front surface of a multiple-stage article storage shelf and transporting an article in each stage of the article storage shelf. It is a matter of course that the moving body is not limited to the article transport vehicle, and has only to include the power supply apparatus receiving power in a contactless manner from the feeder lines arranged along the moving route of the moving body and supplying the power to the electrical load of the moving body.

FIG. 1 illustrates one example of an article transport facility 100 where the overhead transport vehicle 30 is used. The article transport facility 100 includes the overhead transport vehicles 30 and the rails 20 arranged along the moving route 10 as a travel route of the overhead transport vehicles 30. The overhead transport vehicles 30 are guided by the rails 20 and travel along the moving route 10. Articles to be transported by the overhead transport vehicles 30 are a front opening unified pod (FOUP) housing semiconductor substrates, glass substrates serving as display materials, and the like, for example. The article transport facility 100 is also provided with a housing box (not illustrated) housing semiconductor substrates or an article treatment section P applying various kinds of treatment for forming circuits and the like on semiconductor substrates.

As illustrated in FIG. 2, the overhead transport vehicle 30 includes a travel section 12 guided by the rails 20 forming a pair arranged to be suspended from and supported by the ceiling along the moving route 10 and traveling along the moving route 10, a body section 13 positioned below the rails 20 and suspended from and supported by the travel section 12, and a power receiving device including a power receiver 4 receiving drive power in a contactless manner from feeder lines 3 arranged along the moving route 10. Although a detailed description is omitted, the body section 13 includes an article support section having a gripping section gripping an article by the gripping section, supporting the article in a suspended state, and vertically movable with respect to the body section 13. The overhead transport vehicle 30, for example, grips an article placed on an article placement table of the article treatment section P by the gripping section and lifts the article up, travels and transports the article in a state where the article is suspended and supported, and places the article on an article placement table of another article treatment section P.

The travel section 12 is provided with a pair of travel wheels 15 rotationally driven by an electric drive motor 14 as illustrated in FIG. 2. The travel wheels 15 roll on the travel surfaces formed by the upper surfaces of the rails 20. The travel section 12 is further provided with a pair of guide wheels 16 freely rotating around the axial center along a vertical direction V (around the vertical axial center) in a state of abutting on the inner surfaces of the pair of travel rails 20. The travel section 12 includes the drive motor 14 for traveling, a drive circuit for the drive motor 14, and the like, and causes the overhead transport vehicle 30 to travel along the travel rails 20. The body section 13 is provided with an actuator vertically moving the article support section, an actuator driving the gripping section gripping the article, and the like, drive circuits for the actuators, and the like (which are not illustrated). The drive motor 14, actuators, drive circuits, and the like are electrical loads in the overhead transport vehicle 30. The drive circuits and the like are controlled by a controller 31 (see FIG. 5).

Figure 3:
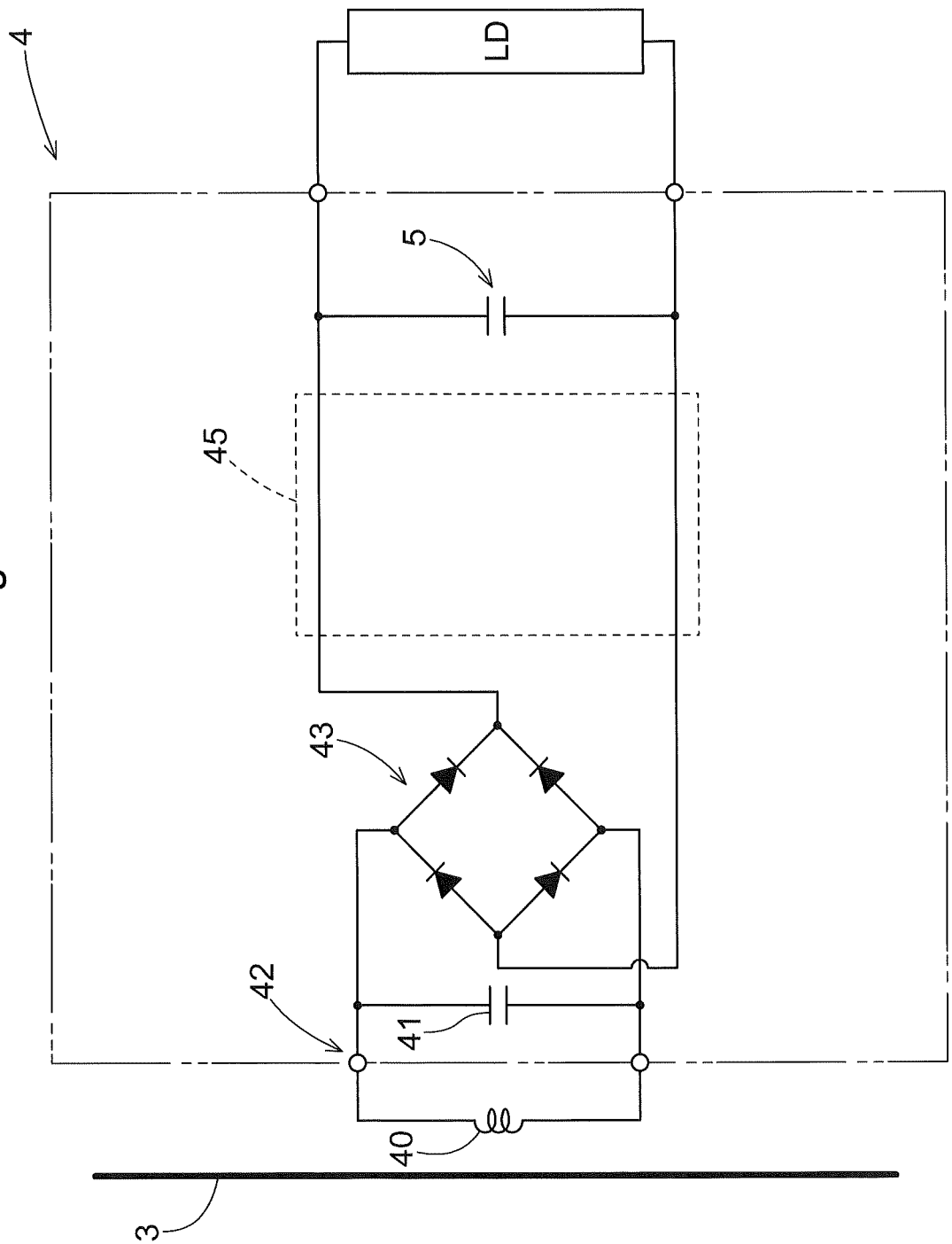
FIG. 3 is a circuit block diagram schematically illustrating one example of a power receiver.

Power to the drive motor 14, various kinds of actuators, drive circuits for driving them, and the like is supplied in a contactless manner from the feeder lines 3 to the power receiver 4 (see FIG. 3). As described above, the feeder lines 3 supplying the drive power to the overhead transport vehicle 30 through the power receiver 4 are arranged along the moving route 10. The article transport facility 100 is provided with a contactless power feeding facility using a wireless power feeding technology referred to as HID (High Efficiency Inductive Power Distribution Technology), and supplies drive power to the electrical loads of the overhead transport vehicle 30. The wireless power feeding facility includes the feeder lines 3 and a power supply apparatus (not illustrated) connected to the feeder lines 3 and supplying an AC current to the feeder lines 3.

As illustrated in FIG. 3, the power receiver 4 includes a pickup coil 40 (see FIG. 2) arranged in the overhead transport vehicle 30 to face the feeder line 3 and a power circuit, such as a rectifier circuit 43, formed on a wiring board inside the overhead transport vehicle 30. As described above, a power feeding device causes a high-frequency current to flow through the feeder line 3 as an induction line and generates a magnetic field around the feeder line 3. The pickup coil 40 generates induced electromotive force by an AC current flowing into the feeder line 3. As illustrated in FIG. 3, the power receiver 4 is electrically connected to the pickup coil 40, and an electrical load LD in which the power consumption fluctuates is electrically connected to the power receiver 4.

The power receiver 4 is formed with a part of a resonance circuit 42 constituted with the pickup coil 40 and a rectifier circuit 43. Although a description of a detailed configuration is omitted, the power receiver 4 may further include a voltage regulator 45, such as a regulation circuit for stabilizing a rectified DC voltage at a constant specified voltage, a booster circuit for boosting the voltage, or a step-down circuit for stepping down the voltage. As one aspect, the voltage regulator 45 can be constituted by, for example, a chopper circuit. The resonance circuit 42 is formed as a parallel circuit of the pickup coil 40 and a resonance capacitor 41, and the resonance capacitor 41 is mounted on the wiring board. Herein, the parallel resonance circuit is described as an example of the resonance circuit, but the resonance circuit may be constituted by a series resonance circuit.

The rectifier circuit 43 is connected in parallel to the resonance circuit 42 (resonance capacitor 41). The rectifier circuit 43 is connected to the pickup coil 40 (connected to the resonance circuit 42) to rectify an AC current and an AC voltage induced to the pickup coil 40 into a DC current and a DC voltage. This embodiment describes a form in which the rectifier circuit 43 is a full-wave rectifier circuit as an example. The rectifier circuit 43 may be a half-wave rectifier circuit, although the illustration and a detailed description are omitted because it can be easily understood by those skilled in the art. Alternatively, a form may be acceptable in which the power receiver 4 is not constituted by the resonance circuit, and the AC current induced to the pickup coil 40 is rectified by the rectifier circuit 43.

As illustrated in FIG. 3, a capacitor 5 is connected to a positive electrode and a negative electrode on the output side of the power receiver 4. The capacitor 5 is provided to suppress fluctuations of a DC voltage output from the power receiver 4 due to the influence of fluctuations of a DC voltage generated by the power receiver 4 and load fluctuations of the electrical load LD. The overhead transport vehicle 30 travels on the rails 20, and therefore the distance between the pickup coil 40 mounted in the overhead transport vehicle 30 and the feeder line 3 arranged along the rail 20 fluctuates. Further, as illustrated in FIG. 1, the moving route 10 includes not only a straight route, but a curved route. There is a possibility that the distance between the feeder line 3 and the pickup coil 40 is also different between a case where the overhead transport vehicle 30 travels on the curved route and a case where the overhead transport vehicle 30 travels on the straight route. The voltage induced to the pickup coil 40 also varies depending on the distance between the feeder line 3 and the pickup coil 40. Accordingly, the DC voltage generated by the power receiver 4 also fluctuates in some cases. The capacitor 5 functions in such a case to suppress the fluctuations of the DC voltage generated by the power receiver 4 and maintain a constant voltage.

As described above, the power consumption of the electrical load LD fluctuates. In particular, when the power consumption temporarily increases and a current flowing into the electrical load LD increases, there is a risk that the DC voltage output from the power receiver 4 decreases. In such a case, a charge stored in the capacitor 5 compensates for the current temporarily consumed by the electrical load LD, so that the decrease in the DC voltage is suppressed. More specifically, the capacitor 5 also functions to suppress the fluctuations of the DC voltage output from the power receiver 4 and maintain a constant voltage when the power consumption of the electrical load LD fluctuates.

Figure 4:
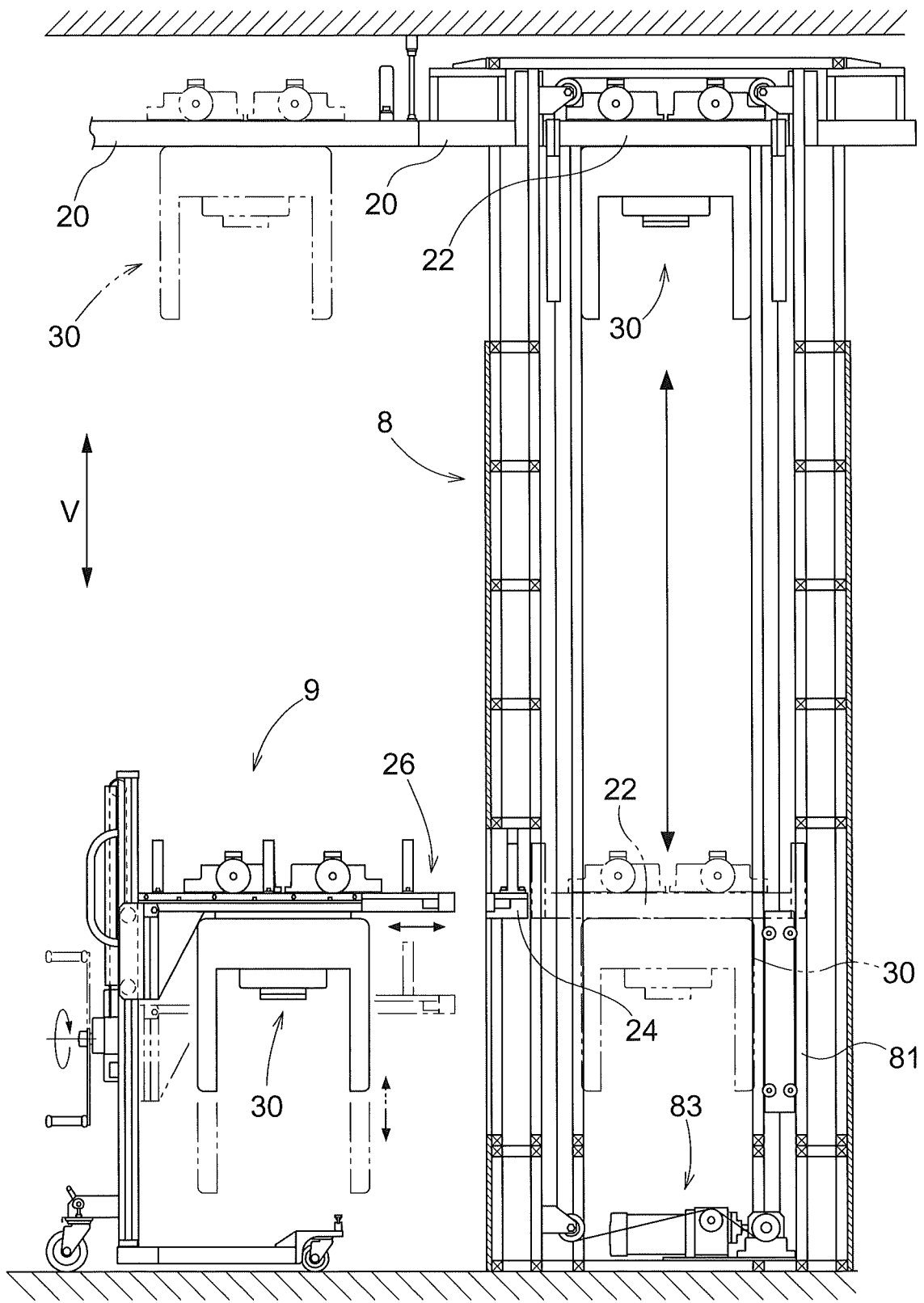
FIG. 4 is a side view illustrating one example of a maintenance lifter.

The overhead transport vehicle 30 needs maintenance, such as periodic inspection or repair of failures in some cases. When the maintenance is carried out, the overhead transport vehicle 30 is lowered to the ground side using a maintenance lifter 8 as a lifter for maintenance including a vertically moving mechanism 83 capable of vertically moving the overhead transport vehicle 30 as illustrated in FIG. 4. The maintenance lifter 8 is a vertically moving device for removing the overhead transport vehicle 30 as the moving body from the moving route 10 and is provided in a specific place of the moving route 10. The overhead transport vehicle 30 to be subjected to maintenance moves to the specific place, and removed from the moving route 10 and lowered to the ground side by the maintenance lifter 8 installed in the specific place.

At this time, the overhead transport vehicle 30 is separated from the rails 20 as the moving route, and lowered to the ground side in a state where the travel wheels 15 are placed on and supported by a vertically moving rail 22 supported by the maintenance lifter 8 and vertically moving. The overhead transport vehicle 30 lowered to the ground side can move to any work site by being moved to a maintenance carriage 9 movable on the floor surface in a state of supporting the overhead transport vehicle 30. The travel wheels 15 of the overhead transport vehicle 30 lowered to the ground roll in turn on the vertically moving rail 22, a transfer rail 24 provided in a post 81 of the maintenance lifter 8, and a carriage rail 26 provided in the maintenance carriage 9, so that the overhead transport vehicle 30 moves from the maintenance lifter 8 to the maintenance carriage 9. The maintenance carriage 9 is movable by a manual operation by an operator in the state where the overhead transport vehicle 30 is placed and supported. It is a matter of course that the maintenance carriage 9 may be movable using not only human power by a motor assistance.

Herein, the feeder lines 3 are arranged along the rails 20, and therefore, when the overhead transport vehicle 30 is separated from the rails 20 for maintenance, the overhead transport vehicle 30 is also separated from the feeder lines 3, making it impossible for the overhead transport vehicle 30 to receive power from the feeder lines 3. More specifically, the overhead transport vehicle 30 receiving the power supply in a contactless manner from the feeder line 3 arranged along the moving route 10 are separated from the rail 20 as the moving route 10 in maintenance, making it difficult for the overhead transport vehicle 30 to receive the power supply through the feeder lines 3.

When a floor transport vehicle or a stacker crane travelling on rails installed on the floor surface is moved to a position deviated from the moving route 10, the floor transport vehicle or the stacker crane also cannot receive the power supply from the feeder lines 3 arranged along the rails. When an article transport vehicle moving on rails installed horizontally in each stage of a multiple-stage article storage shelf is removed from the rails, the article transport vehicle also cannot receive the power supply from the feeder lines 3 arranged along the rails. There are various kinds of maintenance facilities for removing each article transport vehicle from the moving route, and therefore a detailed description of each maintenance facility is omitted herein. However, irrespective of the form of the moving body, when the moving body is separated from the moving route 10 in maintenance, the moving body is similarly difficult to receive the power supply through the feeder lines 3.

Figure 5:
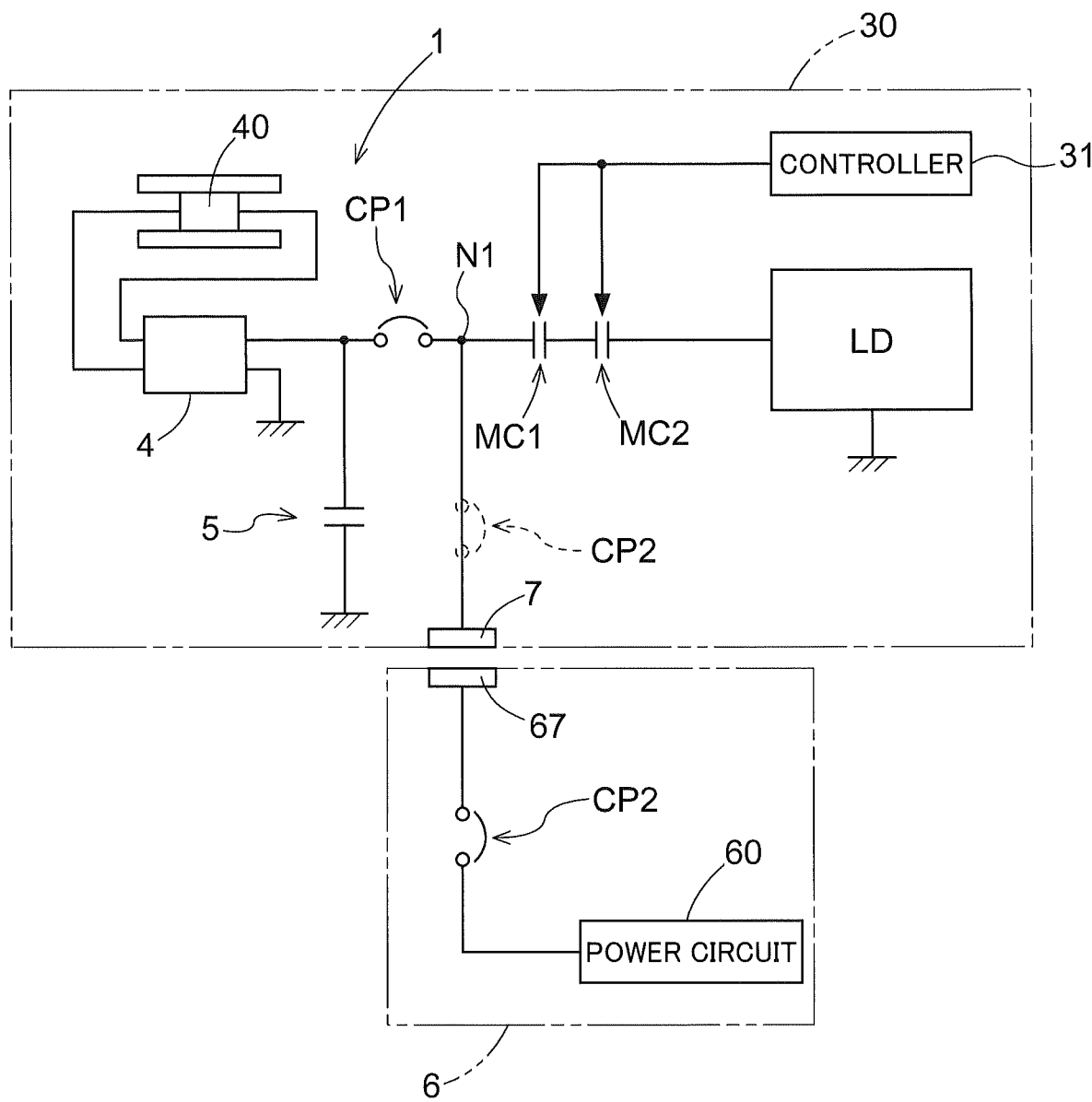
FIG. 5 is a block diagram illustrating one example of a power supply apparatus.

Thus, when the power supply cannot be supplied through the feeder lines 3 in such maintenance, the power is supplied from an external power supply 6 to the overhead transport vehicle 30 as illustrated in FIG. 5. Therefore, the power supply apparatus 1 of the overhead transport vehicle 30 including the above-described power receiver 4 is configured to allow the connection of the external power supply 6 as illustrated in FIG. 5. More specifically, the power supply apparatus 1 includes the pickup coil 40 generating induced electromotive force by an AC current flowing into the feeder lines 3, the power receiver 4 converting an AC power received by the pickup coil 40 into a DC power, the capacitor 5 connected to the positive electrode and the negative electrode on the output side of the power receiver 4, a circuit protector CP1 (a first circuit protector) provided between the power receiver 4 and the capacitor 5, and the electrical load LD, and an external power supply connector 7 provided to allow the connection of the DC external power supply 6 to a first node N1 between the circuit protector CP1 and the electrical load LD.

The external power supply 6 includes a power circuit 60 connected to a commercially available power supply, for example, and generating a voltage equal to the voltage generated by the power receiver 4 of the overhead transport vehicle 30 and an output connector 67 connected to the external power supply connector 7. The connection of the output connector 67 to the external power connector 7 enables the power supply from the external power supply 6 to the overhead transport vehicle 30. The external power supply 6 is connected to the external power supply connector 7 when the overhead transport vehicle 30 is removed from the maintenance lifter 8, for example.

Figure 6:
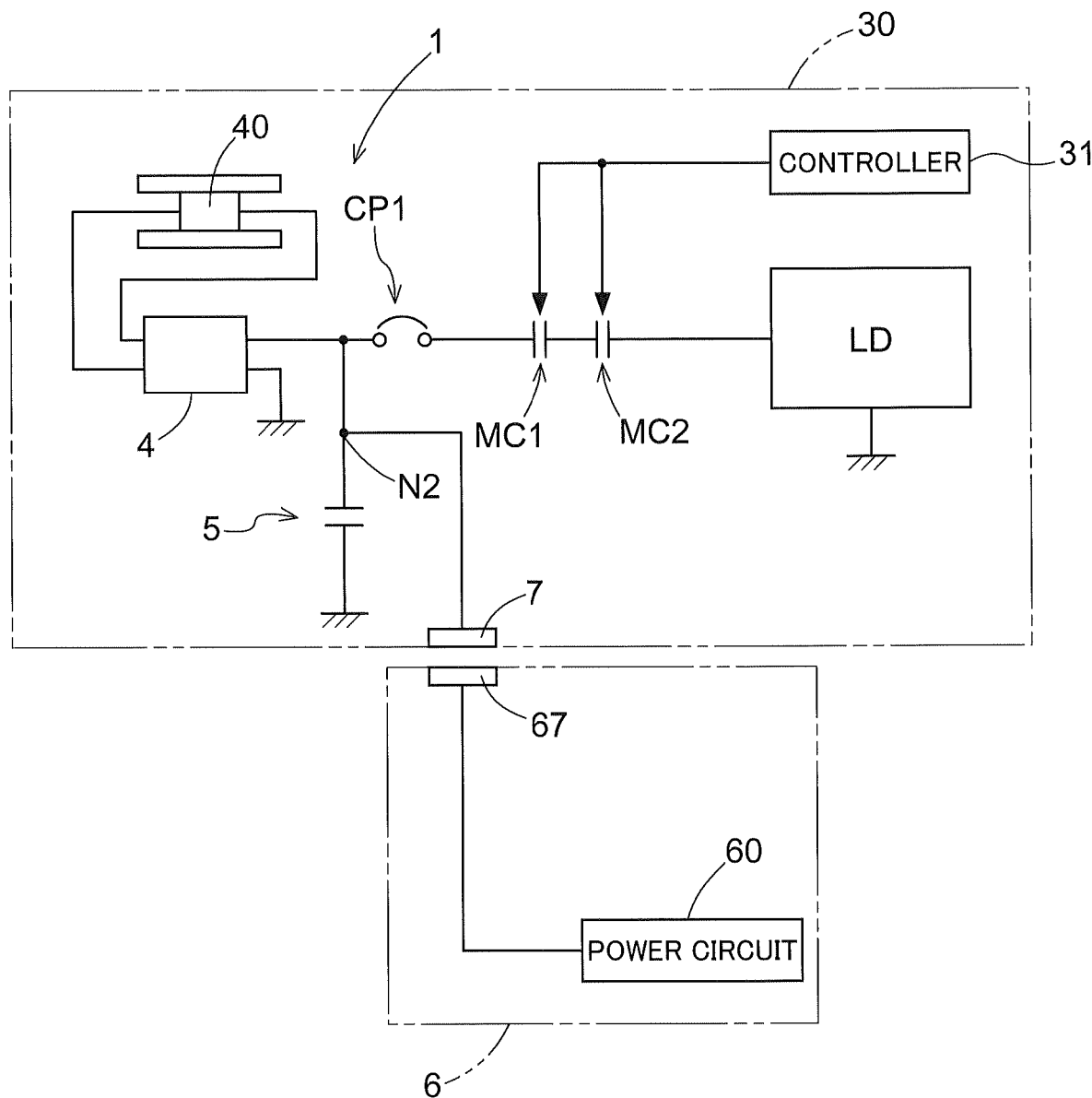
FIG. 6 is a block diagram illustrating one example of a power supply apparatus of Comparative Example.

FIG. 6 illustrates the power supply apparatus 1 as Comparative Example. The power supply apparatus 1 of Comparative Example also includes the pickup coil 40, the power receiver 4, the capacitor 5, the circuit protector CP1, and the external power supply connector 7. However, unlike the power supply apparatus 1 of this embodiment illustrated in FIG. 5, the external power supply connector 7 is provided to be connectable to not the first node N1 between the circuit protector CP1 and the electrical load LD, but a second node N2 between the power receiver 4 and the circuit protector CP1, i.e., the external power supply connector 7 is provided to allow the connection of the DC external power supply 6 to the positive electrode side of the capacitor 5.

When the DC external power supply 6 is connected to the positive electrode side of the capacitor 5 as in the power supply apparatus 1 of Comparative Example, there is a risk that a large residual charge amount of the capacitor 5 causes a large current to flow from the capacitor 5 to the external power supply 6 when the external power supply 6 is connected to the external power supply connector 7. Therefore, discharge treatment of discharging the capacitor 5 is preferably performed in advance when the external power supply 6 is connected. The residual charge amount cannot be visually confirmed, and therefore the omission of the discharge treatment is not preferable even when the residual charge amount of the capacitor 5 is small. For example, at least confirmation work, such as measuring the voltage between terminals of the capacitor 5, is required.

In contrast thereto, the power supply apparatus 1 of this embodiment includes the circuit protector CP1 between the positive electrode of the capacitor 5 and the external power supply connector 7. Thus, the electrical connection between the capacitor 5 and the external power supply 6 can be cut off in advance when the circuit protector CP1 is brought into an open state by a manual operation by an operator, for example. Accordingly, the external power supply 6 can be connected to the external power supply connector 7 without considering the magnitude of the current flowing from the capacitor 5 irrespective of the residual charge of the capacitor 5. Even when the circuit protector CP1 is not brought into the open state, a protection operation performed by the circuit protector CP1 in a case where the residual charge amount of the capacitor 5 is large and a large current flows from the capacitor 5 suppresses the flow of a current leading to a failure of the external power supply 6 into the external power supply 6.

More specifically, the power supply apparatus 1 of this embodiment can enhance work efficiency as compared with the power supply apparatus 1 of Comparative Example because the power supply apparatus 1 of this embodiment can maintain safety of the work of connecting the external power supply 6 to the overhead transport vehicle 30 without performing the discharge treatment of discharging the residual charge of the capacitor 5 when the external power supply is connected to the moving body for inspection, repair, or the like.

There is a possibility that such a current that the circuit protector CP1 does not perform the protection operation flows into the external power supply 6. Therefore, the external power supply 6 preferably has resistance to a rush current to the extent that the circuit protector CP1 initiates the protection operation.

Alternatively or in addition, a second circuit protector CP2 different from the above-described circuit protector CP1 is suitably provided on an electrical connection path between the first node N1 and the internal circuit (e.g. power circuit 60) of the external power supply 6 in the state where the external power supply 6 is connected to the external power supply connector 7. The circuit protector CP1 is provided between the power receiver 4 and the electrical load LD in the overhead transport vehicle 30. More specifically, a threshold current value at which the circuit protector CP1 performs the protection operation is set based on the electrical specification of the power receiver 4 or the electrical load LD to protect the power receiver 4 or the electrical load LD. Therefore, when the current is an overcurrent for the external power supply 6 but is permissible for the power receiver 4 or the electrical load LD, the electrical connection is not cut off in the circuit protector CP1 in some cases.

By arranging the second circuit protector CP2 on the electrical connection path between the first node N1 and the power circuit 60 of the external power supply 6, a protection circuit can be provided for protecting the external power supply 6, the protection circuit which can set a threshold current value according to the specification of the external power supply 6 and appropriately perform the protection operation. Even when an overcurrent flows from the capacitor 5 when the external power supply 6 is connected to the external power supply connector 7, the overcurrent can be avoided from reaching the internal circuit of the external power supply 6. Accordingly, the work safety when the external power supply 6 is connected to the overhead transport vehicle 30 can be enhanced.

The second circuit protector CP2 may be provided on the side of the external power supply 6 as illustrated in FIG. 5 or may be provided on the side of the overhead transport vehicle 30. More specifically, the external power supply 6 may further include the second circuit protector CP2 different from the circuit protector CP1 between the first node N1 and the internal circuit of the external power supply 6, or the overhead transport vehicle 30 as the moving body may further include the second circuit protector CP2 different from the circuit protector CP1 between the first node N1 and the internal circuit of the external power supply 6. When the external power supply 6 includes the second circuit protector CP2, the second circuit protector CP2 is suitably arranged between the output connector 67 and the power circuit 60 as the internal circuit. When the overhead transport vehicle 30 includes the second circuit protector CP2, the second circuit protector CP2 is suitably arranged between the first node N1 and the external power supply connector 7. In any case, it can be said that the power supply apparatus 1 includes the second circuit protector CP2 different from the circuit protector CP1 between the first node N1 and the internal circuit of the external power supply 6.

When the second circuit protector CP2 is arranged in the overhead transport vehicle 30, all of the overhead transport vehicles 30 are mounted with the second circuit protector CP2. In general, in the article transport facility 100, the number of the external power supplies 6 used only in maintenance is smaller than the number of the overhead transport vehicles 30. Therefore, the cost can be reduced when the second circuit protector CP2 is arranged on the side of the external power supply 6. When the second circuit protector CP2 is mounted on the side of the overhead transport vehicle 30, the manually cutting-off the electrical connection requires the removal of a cover or the like of the overhead transport vehicle 30. In contrast, the case where the second circuit protector CP2 is mounted on the side of the external power supply 6 is suitable because an operator can easily operate the second circuit protector CP2 in maintenance work.

As described above, even when the second circuit protector CP2 is not provided or even when the external power supply 6 is connected to the external power supply connector 7 without discharging the residual charge of the capacitor 5, the flow of a large current into the external power supply 6 from the capacitor 5 can be suppressed. Accordingly, it is a matter of course that the configuration of not including the second circuit protector CP2 may be acceptable.

Further, as illustrated in FIG. 5, it is suitable that electromagnetic switches (first electromagnetic switch MC1, second electromagnetic switch MC2) are connected to the first node N1 and the electrical load LD, the electromagnetic switches which are controlled by the controller 31 of the overhead transport vehicle 30 and can cut off the electrical connection between the first node N1 and the electrical load LD. Although power is supplied also to the controller 31 through the power receiver 4, it is suitable that the overhead transport vehicle 30 includes a backup power supply (e.g., a power storage device including a secondary battery or a primary battery, such as a dry battery) capable of supplying power to the controller 31 for a certain period of time even when the power supply to the overhead transport vehicle 30 is cut off. The rated value of an operating voltage of such a controller 31 is generally about 3.3 to 5 V. Further, the power consumption is not large, and therefore a small capacity backup power supply is sufficient.

When the power supply to the electrical load LD needs to be cut off, the electromagnetic switches are controlled to be brought into an open state. The electromagnetic switches are provided between the first node N1 and the electrical load LD, and therefore the power supply to the electrical load LD can be cut off by the control of the electromagnetic switches even when the overhead transport vehicle 30 receives the power supply from the feeder lines 3 or even when the overhead transport vehicle 30 receives the power supply from the external power supply 6. More specifically, the overhead transport vehicle 30 can be operated under the same conditions as the ordinary conditions, even when the external power supply 6 is connected to the overhead transport vehicle 30.

This embodiment describes the form, as an example, in which the first electromagnetic switch MC1 and the second electromagnetic switch MC2 are connected in series with redundancy such that the electrical connection between the first node N1 and the electrical load LD can be cut off even when any one of the electromagnetic switches causes a so-called on-failure and is brought into a permanently connected state, so that the circuit cannot be opened. However, when the electromagnetic switch is provided which can cut off the electrical connection between the first node N1 and the electrical load LD, it is not always necessary to have two electromagnetic switches in series, and a form of having only one electromagnetic switch may be acceptable. It is a matter course that a form in which three or more electromagnetic switches are arranged in series is not precluded.

Further it is a matter of course that a configuration in which the power supply apparatus 1 does not include such an electromagnetic switch is not precluded.

The following description gives a brief overview of the power supply apparatus described above.

As one aspect, the power supply apparatus mounded in the moving body and receiving power in a contactless manner from the feeder lines arranged along the moving route of the moving body and supplying the power to the electrical load of the moving body includes: the pickup coil configured to generate induced electromotive force by the alternating current flowing into the feeder lines; the power receiver configured to convert the alternating-current power received by the pickup coil into the direct-current power; the capacitor connected to the positive electrode and the negative electrode on the output side of the power receiver; the first circuit protector provided between (i) the power receiver and the capacitor and (ii) the electrical load; and the external power supply connector provided to allow the connection of the direct-current external power supply to the first node between the first circuit protector and the electrical load.

According to this configuration, the external power supply connector is provided on the electrical load side across the first circuit protector with respect to the capacitor, and therefore, after the electrical connection between the power receiver and the electrical load is cut off by the first circuit protector, for example, the flow of a large current into the external power supply from the capacitor can be suppressed even when the external power supply is connected to the external power supply connector without discharging the residual charge of the capacitor. The safety of work of connecting the external power supply to the moving body can be maintained without performing the discharge treatment of discharging the residual charge of the capacitor when the external power supply is connected to the moving body for inspection, repair, or the like, and therefore the work efficiency can be enhanced. Thus, this configuration can provide the power supply apparatus capable of receiving power from the feeder lines arranged along the moving route of the moving body and supplying the power to the electrical load of the moving body and, unless the power can be received from the feeder lines, appropriately supplying the power to the electrical load from the external power supply.

It is further suitable to further include the second circuit protector between the first node and the internal circuit of the external power supply.

According to this configuration, even when an overcurrent flows from the capacitor when the external power supply is connected to the external power supply connector, the overcurrent can be avoided from reaching the internal circuit of the external power supply. Accordingly, the work safety when the external power supply is connected to the moving body can be enhanced.

It is suitable that the power supply apparatus further includes the electromagnetic switch connected to the first node and the electrical load, the electromagnetic switch being controlled by the controller of the moving body and capable of cutting off the electrical connection between the first node and the electrical load.

When the power supply to the electrical load needs to be cut off, the electromagnetic switch is controlled to be brought into the open state. The electromagnetic switch is provided between the first node and the electrical load, and therefore the power supply to the electrical load can be cut off by the control of the electromagnetic switch even when the moving body receives the power supply from the feeder lines or even when the moving body receives the power supply from the external power supply. More specifically, according to this configuration, the moving body can be operated under the same conditions as the ordinary conditions, even when the external power supply is connected to the moving body.

Further, it is also suitable that the moving route is constituted by the rails suspended from the ceiling of a building, the moving body is the overhead transport vehicle moving along the rails and transporting an article, the vertically moving device for removing the moving body from the moving route is provided in a specific place of the moving route, and the external power supply is connected to the external power supply connector after the moving body is removed from the moving route.

The power supply apparatus of this configuration is also useful for a case where the moving body is the overhead transport vehicle. According to this configuration, even when the overhead transport vehicle is removed from the rails provided with the feeder lines for inspection, repair, or the like, power can be supplied to the overhead transport vehicle, making it possible to cause the overhead transport vehicle to perform various kinds of operations. Accordingly, the efficiency of the work, such as inspection or repair, can be easily enhanced.

What is claimed is:

1. A power supply apparatus mounted in a moving body and receiving power in a contactless manner from a feeder line arranged along a moving route of the moving body and supplying the power to an electrical load of the moving body, the power supply apparatus comprising:
    a pickup coil configured to generate induced electromotive force by an alternating current flowing through the feeder line;
    a power receiver configured to convert an alternating-current power received by the pickup coil into a direct-current power, the power receiver comprising a rectifier circuit and a voltage regulator;
    a capacitor connected to a positive electrode and a negative electrode on an output side of the power receiver;
    a first circuit protector provided between (i) the power receiver and the capacitor and (ii) the electrical load, wherein the power receiver and the capacitor are electrically upstream of the first circuit protector and the electrical load is electrically downstream of the first circuit protector; and
    an external power supply connector provided to allow connection of a direct-current external power supply to a first node between the first circuit protector and the electrical load,
    wherein the direct-current external power supply is connected to the external power supply connector when the moving body is moved to a position deviated from the moving route and cannot receive the power from the feeder line.

2. The power supply apparatus according to claim 1, further comprising:
    a second circuit protector between the first node and an internal circuit of the direct-current external power supply.

3. The power supply apparatus according to claim 1, further comprising:
    an electromagnetic switch connected to the first node and the electrical load, the electromagnetic switch controlled by a controller of the moving body and capable of cutting off electrical connection between the first node and the electrical load.

4. A power supply apparatus mounted in a moving body and receiving power in a contactless manner from a feeder line arranged along a moving route of the moving body and supplying the power to an electrical load of the moving body, the power supply apparatus comprising:
    a pickup coil configured to generate induced electromotive force by an alternating current flowing through the feeder line;
    a power receiver configured to convert an alternating-current power received by the pickup coil into a direct-current power;
    a capacitor connected to a positive electrode and a negative electrode on an output side of the power receiver;
    a first circuit protector provided between (i) the power receiver and the capacitor and (ii) the electrical load; and
    an external power supply connector provided to allow connection of a direct-current external power supply to a first node between the first circuit protector and the electrical load,
    wherein:
        the moving route is a rail suspended from a ceiling of a building,
        the moving body is an overhead transport vehicle configured to move along the rail and transport an article,
        a vertically moving device for removing the moving body from the moving route is provided in a specific place of the moving route, and
        the direct-current external power supply is connectable to the external power supply connector after the moving body is removed from the moving route.

* * * * *